Patented Oct. 10, 1950

2,525,320

UNITED STATES PATENT OFFICE 2,525,320

HYDROXY BENZENE SULFONAMIDO THIADIAZOLES AND PREPARATION OF SAME

Martin E. Hultquist, Bound Brook, N. J., and Yellapragada SubbaRow, deceased, late of Pearl River, N. Y., by Aloysius J. Bryant, administrator, South Nyack, N. Y., assignors to American Cyanamid Company, New York, N. Y., a corporation of Maine No Drawing. Application September 10, 1948, Serial No. 48,775

11 Claims. (Cl. 260—302)

This invention relates to new and useful sulfonamides and to methods of preparing the same.

This application is a continuation-in-part of application Serial Number 25,524, filed May 6, 1948, entitled Hydroxysulfonamides and Preparation of the same.

It has been discovered that certain p-hydroxybenzenesulfonamido-thiadiazoles possess unexpected anti-viral activity, particularly against the viruses causing poliomyelitis and equine encephalitis and may, therefore, become important drugs in the treatment of these and other viral diseases. The new compounds of the present invention may be represented by the general formula:

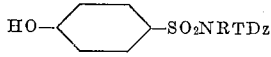

in which TDz represents a thiadiazole radical and R represents hydrogen or an aliphatic, aralkyl, or heterocyclic radical attached to the amide nitrogen atom. The thiadiazole radical may be attached to the amide nitrogen at either the 2 or 5 position on the thiadiazole ring. The thiadiazole radical may also bear substituent radicals such as aliphatic, aromatic, aralkyl, carboxy, and amino radicals, and the like.

The hydrogen atom of the phenolic —OH radical as well as that attached to the amide nitrogen where R equals hydrogen are acidic in nature and may be replaced by simple neutralization or otherwise with a cationic radical of a metal or organic base. Such salts are of particular value especially in that the solubility of the compound is affected thereby, usually increased. Obviously, such salts are included within the scope of the present invention.

The new p-hydroxybenzenesulfonamidothiadiazoles may be prepared by several distinct methods, the more important of which will be described in the specific examples which follow. The preferred method is by the hydrolysis of a suitable ester of a p-hydroxybenzenesulfonamidothiadiazole under either acidic or alkaline conditions whereby the —OH group is formed in the reaction. These esters which have the general formula

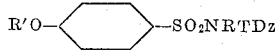

R' being an acyl radical, are believed to be new and are intended to be included within the scope of the invention. These esters are valuable per se as drugs since they may be hydrolyzed in the system. Examples of the hydrolysis will be given hereinafter.

To prepare the new acyl compounds of the present invention several methods are available. A preferred method involves the condensation of an appropriate benzene sulfonyl halide with an aminothiadiazole in accordance with the following equation:

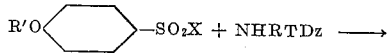

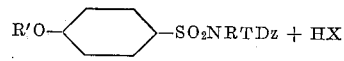

In the above R' is an acyl radical such as benzoyl, acetyl, furoyl, tosyl, carbethoxy or the like which may later be removed by hydrolysis. X is a halogen, preferably chlorine, but if desired fluorine, bromine or iodine. TDz is a thiadiazolyl radical such as mentioned above in which the amino group is attached to a carbon atom in the thiadiazole ring.

To prepare intermediates in which R is an organic radical of the kind mentioned above, secondary amines such as 2-N-(beta-hydroxyethyl)-amino-thiadiazole, 2-(N-methylamino) thiadiazole and the like are employed in the reaction.

The preferred method of effecting the condensation is to bring together the reactants shown in the above equation at 0° to 100° C. until condensation is completed. It is preferred that the condensation be conducted with the reactants dissolved or suspended in a tertiary nitrogen base such as pyridine or in an organic solvent containing a basic compound such as sodium carbonate or trimethylamine as acid acceptor or in an aqueous solution containing a substance which will react with the hydrohalide acid formed during the reaction and prevent it from interfering with the reaction.

Hydrolysis of the resulting compounds to convert the group R'O— to HO— can be effected over a wide range of conditions. The temperature for the hydrolysis may range from about 0° to 150° C. with the preferred temperatures being between 50° and 100° C., but this may vary with the nature of the compound being hydrolyzed. Sodium hydroxide at a concentration of approximately 10% and a slight molecular excess, usually about 1 mol, is preferred. Other alkaline hydrolyzing agents including potassium hydroxide, barium hydroxide, calcium hydroxide, trimethylbenzylammonium hydroxide or other quaternary hydroxide, ammonia and the like may also be used. Conversion of the group R'O— to HO— can also be effected by hydrolysis under acidic conditions using hydrochloric acid, sulfuric acid or other known acid hydrolyzing agents.

The time for completion of the hydrolysis depends on several factors including the temperature, the concentration of the hydrolyzing agent, the nature of the compounds etc. Using, for example, sodium hydroxide at 10% concentration and at a temperature of 75° to 95° C., the hydrolysis is completed in about one hour.

Although hydrolysis is usually conducted under essentially aqueous conditions, the water may be replaced in part or largely with water miscible solvents such as alcohol. The presence of an inert water immiscible organic solvent in the reaction mixture is not precluded and, in fact, may offer advantages in some cases.

A distinct method of preparing the compounds of the present invention involves the use as starting material one of the known p-amino-benzenesulfonamidothiadiazoles. This process involves diazotization of the p-amino- group on the benzene ring followed by decomposition of the diazo compound under carefully controlled conditions so that a hydroxy group is formed. In general, the diazotization is carried out in the customary manner at 0° to 25° C. in 5% to 20% sulfuric acid using a slight excess of the theoretical amount of sodium nitrite. When the diazotization is complete the solution is heated to 50° to 80° C. to cause decomposition to take place. A flash decomposition carried out by passing the solution through a hot tube or through a steam gun is quite successful. A large excess of sulfuric acid may be used in the process, varying from 2 mols upwards. Decomposition is usually complete in 15 to 20 minutes at 80° C. Other acids such as hydrochloric, acetic, phosphoric and the like may, of course, be used to replace the sulfuric, if desired.

The invention will now be illustrated by the preparation of representative p-hydroxybenzenesulfonamidothiadiazoles in the following examples. All parts are by weight unless otherwise indicated.

*Example 1*

Thirty parts of 1-benzoyloxybenzene-4-sulfonyl chloride is added gradually at 10°–15° C. with stirring to 11.5 parts of 2-amino-5-methylthiadiazole in 25 parts of pyridine. The mixture is allowed to stand for a half hour, and 150 parts of water is gradually added to cause crystallization; 22.9 parts of crude product is obtained. The crude crystalline product is added to 100 parts of 10% sodium hydroxide and heated for a half hour at 90° C. Dilute hydrochloric acid is added to a pH of 3.0–3.5, and the precipitated crystalline product obtained is cooled to 15° C. and filtered, washed with water and dried at 110° C. The dried product is extracted with ether to remove the benzoic acid present. The crystalline product remaining behind has a melting point of 224.5°–225.5° C. Analysis of this compound shows it to be N-(5-methyl-2-thiadiazolyl)-1-phenol-4-sulfonamide.

*Example 2*

A solution of 35 grams of sodium nitrite in 200 cc. of water is added to a mixture of 128 grams of N¹-(1,3,4-thiadiazolyl-2)sulfanilamide, 2000 cc. of water, 100 cc. of concentrated sulfuric acid, and 1000 grams of ice. Some yellow diazo compound precipitates. The whole is heated to 90–95° C. for 30 minutes, whereupon the yellow precipitate dissolves, and foam and some tar appear. The supernatant liquor is decanted from the tar, and on cooling the product, N-(1,3,4-thiadiazolyl-2)-1-phenol-4-sulfonamide, crystallizes out. It is purified by recrystallization from alcohol and from water, with the aid of activated charcoal as a decolorizing agent. White, sandy crystals are obtained, which melt at 241.5–243° C.

What is claimed is:

1. Compounds having the general formula:

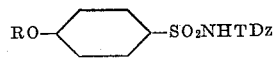

in which R is a member of the group consisting of hydrogen and acyl radicals and TDz is a thiadiazolyl radical, and the salts of said compounds.

2. Compounds having the general formula:

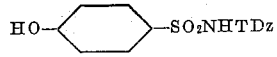

in which TDz is a thiadiazolyl radical.

3. N-(5-methyl-1,3,4-thiadiazolyl-2)-1-phenol-4-sulfonamide.

4. N-(5-ethyl-1,3,4-thiadiazolyl-2)-1-phenol-4-sulfonamide.

5. N-(1,3,4-thiadiazolyl-2)-1-phenol-4-sulfonamide.

6. A method which comprises hydrolyzing a compound having the general formula:

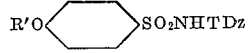

in which R′ is an acyl radical and TDz is a thiadiazolyl radical until the acyl group has been removed.

7. A method which comprises hydrolyzing a compound having the general formula:

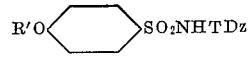

in which R′ is an acyl radical and TDz is a thiadiazolyl radical, in the presence of water at a temperature within the range 0° to 150° C. with an alkaline hydrolyzing agent until the acyl group has been removed.

8. A method of preparing compounds having the formula:

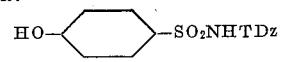

in which TDz is a thiadiazolyl radical which comprises the steps of subjecting a compound having the formula:

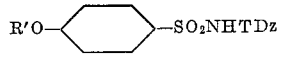

in which R′ is an acyl radical, to the action of an aqueous solution of sodium hydroxide at a temperature within the range 0° to 150° C. until the radical R′ has been removed and thereafter recovering the said product.

9. A method of preparing N-(5-methyl-1,3,4-thiadiazolyl-2)-1-phenol-4-sulfonamide which comprises the step of treating N-(5-methyl-2-thiadiazolyl)-1-benzoyloxybenzene-4-sulfonamide with a hydrolyzing agent until N-(5-methyl-1,3,4-thiadiazolyl-2)-1-phenol-4-sulfonamide is formed, and thereafter recovering the said product.

10. A method of preparing N-(5-carboxy-1,3,4-thiadiazolyl-2)-1-phenol-4-sulfonamide which comprises the step of treating N-(5-carboxy-1,3,4-thiadiazolyl-2)-1-acetoxybenzene-4-sulfonamide with a hydrolyzing agent until N-(5-carboxy-1,3,4-thiadiazolyl-2)-1-phenol-4-sulfonamide is formed, and thereafter recovering the said product.

11. A method of preparing N-(5-phenyl-1,3,4-thiadiazolyl-2)-1-phenol-4 - sulfonamide which comprises the step of treating N-(5-phenyl-1,3,4-thiadiazolyl-2)-1-carbethoxyoxybenzene-4 - sulfonamide with a hydrolyzing agent until N-(5-phenyl-1,3,4-thiadiazolyl-2)-1 -phenol-4-sulfonamide is obtained, and recovering the said product.

MARTIN E. HULTQUIST.
ALOYSIUS J. BRYANT,
*Administrator of the Estate of Yellapragada SubbaRow, Deceased.*

REFERENCES CITED

The following references are of record in the file of this patent:

UNITED STATES PATENTS

| Number | Name | Date |
| --- | --- | --- |
| 2,447,702 | Hubner | Aug. 24, 1945 |

OTHER REFERENCES

Billion, Biologie Medicale, vol. 27, Supp. 1937, p. 84.

Kermack, Jr. Chem. Society (London) 1939, pp. 608–609.